US010279403B2

United States Patent
Wachtel

(10) Patent No.: US 10,279,403 B2
(45) Date of Patent: May 7, 2019

(54) J-CHANNEL SHEARS

(71) Applicant: Anthony Wachtel, Saint Clair, MI (US)

(72) Inventor: Anthony Wachtel, Saint Clair, MI (US)

( * ) Notice: Subject to any disclaimer, the term of this patent is extended or adjusted under 35 U.S.C. 154(b) by 0 days.

(21) Appl. No.: 15/867,459

(22) Filed: Jan. 10, 2018

(65) Prior Publication Data

US 2018/0193931 A1    Jul. 12, 2018

Related U.S. Application Data

(60) Provisional application No. 62/444,527, filed on Jan. 10, 2017.

(51) Int. Cl.

| | | |
|---|---|---|
| B23D 29/02 | (2006.01) | |
| B26B 13/06 | (2006.01) | |
| E04F 21/00 | (2006.01) | |
| B23D 29/00 | (2006.01) | |
| E04D 15/00 | (2006.01) | |

(52) U.S. Cl.
CPC .............. *B23D 29/02* (2013.01); *B23D 29/00* (2013.01); *B26B 13/06* (2013.01); *E04F 21/00* (2013.01); *E04F 21/0069* (2013.01); *E04D 15/00* (2013.01)

(58) Field of Classification Search
CPC ........ B23D 29/02; B23D 29/00; E04D 15/00; E04F 21/00; E04F 21/0069; B26B 13/06
USPC .......................................... 30/229, 249, 258
See application file for complete search history.

(56) References Cited

U.S. PATENT DOCUMENTS

| | | | | |
|---|---|---|---|---|
| 170,658 | A | * | 12/1875 | Berridge |
| 375,555 | A | * | 12/1887 | Loffer |
| 2,179,732 | A | * | 11/1939 | Scanlon ............... B23D 29/023 30/252 |
| 2,284,536 | A | * | 5/1942 | Parker .................. B23D 29/026 30/257 |
| 3,159,913 | A | * | 12/1964 | Winton ................ B23D 29/026 30/233 |
| 3,530,576 | A | * | 9/1970 | Reichborn-Kjennerud ................ B23D 29/023 30/134 |
| 4,510,834 | A | | 4/1985 | Greene et al. |
| 5,038,477 | A | | 8/1991 | Parrow |
| 5,483,746 | A | * | 1/1996 | Beyers .................. B23D 27/02 30/229 |
| 5,913,575 | A | * | 6/1999 | Lai .......................... B26D 3/167 30/178 |
| 6,049,985 | A | * | 4/2000 | Gonzalez ................ B26B 13/06 30/233 |
| 6,115,922 | A | * | 9/2000 | Kline ..................... B23D 29/02 30/229 |
| 6,226,872 | B1 | * | 5/2001 | Kline ..................... B23D 29/02 30/134 |
| 6,240,764 | B1 | | 6/2001 | Geurts |
| 7,437,828 | B1 | | 10/2008 | Rozmiarek |

(Continued)

*Primary Examiner* — Hwei-Siu C Payer
(74) *Attorney, Agent, or Firm* — Cargill & Associates, PLLC; Lynn E. Cargill

(57) ABSTRACT

In the present invention, there is disclosed a pair of multi-level J-channel cutter shears, comprising a shear blade permanently attached to a handle and a stationary blade being pivotally attached to the shear blade, and wherein an L-shaped channel runs therethrough, creating at least an upper and a lower cutting edge, and wherein the stationary blade includes multi-level cutting surfaces defining the upper and lower cutting edges, and wherein the stationary blade is also attached to a handle.

6 Claims, 10 Drawing Sheets

(56) References Cited

U.S. PATENT DOCUMENTS

| | | | |
|---|---|---|---|
| 2006/0213066 A1* | 9/2006 | Yu Chen | B23D 29/00 30/229 |
| 2007/0204470 A1* | 9/2007 | Lai | B26B 17/00 30/244 |
| 2018/0193931 A1* | 7/2018 | Wachtel | E04F 21/0069 |

* cited by examiner

J-CHANNEL SHEARS

CROSS-REFERENCE TO RELATED APPLICATIONS

This application claims the benefit under 35 U.S.C. 119(e) of U.S. Provisional Application No. 62/444,527 filed on Jan. 10, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to a device for custom cutting and fitting of construction materials, among other materials, methods of manufacturing same, and methods of using same. More particularly, the invention relates to a pair of dual cutting edge shears for cutting J-channels and the like.

2. Description of the Prior Art

Conventional single cutting edge shear cutters have always been promoted to solve the problem of accurately cutting formed articles used in the construction industry, like J-channels commonly used in residential siding, rain gutters or as clothes hanger receivers that are common in clothes closets. Generally these articles are formed of sheeted aluminum strip materials. Prior attempts to provide shear cutters have included the use of straight edge shears and power tools, such as miter saws. The cuts produced using these devices and methods have always required several cuts, of which no two end up being alike. The industry would welcome a hand tool device that makes a reliable and perfect cut every time, with only a single strike. In that regard, the following prior art patents are relevant to the present invention.

U.S. Pat. No. 5,038,477 issued to Parrow, Harold A. on Aug. 13, 1991 which discloses an apparatus for attaching to a power tool for cutting siding or a like material that includes a pair of fixed blades with a movable blade mounted between the two in order to pivot. An adjustment bolt is included for exerting force which will permit the distance between the fixed blades to be varied. The provision also included different sets of fixed blades that can conform to different materials.

U.S. Pat. No. 4,510,834 issued to Greene, Dennis T., et al. on Apr. 16, 1985 discloses a cutter having pivoted support for adjusting the angle of cut to be used on a piece of vinyl or aluminum siding that is held in a fixed position.

U.S. Pat. No. 6,240,764 issued to Geurts, Dennis G. on Jun. 5, 2001 discloses a J-channel siding cutting tool used to cut tabs, notches, or a miter finishing cut in vinyl or aluminum siding in perpendicularly adjacent pieces proximate to the corners of doors or windows of a building, through the one-cut operation of the tool by an individual. The J-channel cutter includes a pair of handles connected on a pivot, a first cutter with a first cutting surface and a first traverse cutting surface, and a second cutter with a second cutting surface and a second traverse cutting surface. The second traverse cutting surface is recessed with respect to the first traverse cutting surface so the individual can determine whether to cut a tab or notch in the siding. It may also include a stop for defining a uniform length of tab or notch, a biasing member for urging the handles apart or separating the first and second cutters, or a travel limiter between the first and second handles for restricting the positioning of the cutters and the handles relative to each other.

U.S. Pat. No. 7,437,828 issued to Rozmiarek, Kenneth C. on Oct. 21, 2008 discloses an apparatus and method for accurately and safely cutting residential siding. The invention includes a specialized tool and saw guide with two connected plates on a hinge to hold and balance the siding during the cutting process along with resilient saw guides. The device allows for both straight edge cuts and angled cuts to match a roof pitch.

However, practitioners of those inventions have become aware of certain problems which are presented by those prior art inventions. One particular problem that has plagued users has been that by using the above mentioned prior art J-channel cutting tools, no two cuts end up being the same, nor are they precise. These complexities give rise to poorly fitting joints and imperfect cuts.

Therefore, it would be desirable to the construction industry if there was provided a tool that every time will perfectly cut a J-channel piece of siding, J-channel closet support, multi-surface gutter perfectly every time, and method of making such a tool, and a method of using such a tool.

SUMMARY OF THE INVENTION

In accordance with the above-noted desires of the industry, the present invention provides various aspects, including a J-channel shear with at least two cutting surfaces, a method of making same, and a method of using the same. The present invention overcomes many of the aforementioned problems with the prior art because a single cutting motion provides a desirable cut with all angles in proper placement such that a J-channel piece of siding will have nicely fitting, complementary angles with a single cut. Furthermore, the cut is a good clean cut, without substantially any rough edges that might cut an installer.

A first aspect of the present invention includes certain features including a pair of shears with at least two cutting surfaces that are capable of nearly simultaneously cutting with a single strike of the shears resulting in a perfectly reproducible, complementary cutting angle in each of the J-channel surfaces that matches every time.

Another aspect of the invention has other features, including the J-channel cutting shears having accommodation for each surface of the J-channel to be cut together. This technique of providing two cuts with one strike of the J-channel cutting shears may therefore be extended to include not only the cutting of J-channel siding pieces, but also the cutting of any other multi-surface work pieces that require complementary angles to be cut at a perfect angle.

The invention is particularly useful for applications of commonly used residential J-channel siding, and other multi-surface construction materials, such as gutters and the like.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, in which like parts are given the same reference numerals, and wherein.

LIST OF REFERENCE NUMERALS UTILIZED IN THE DRAWINGS

Figure 1:
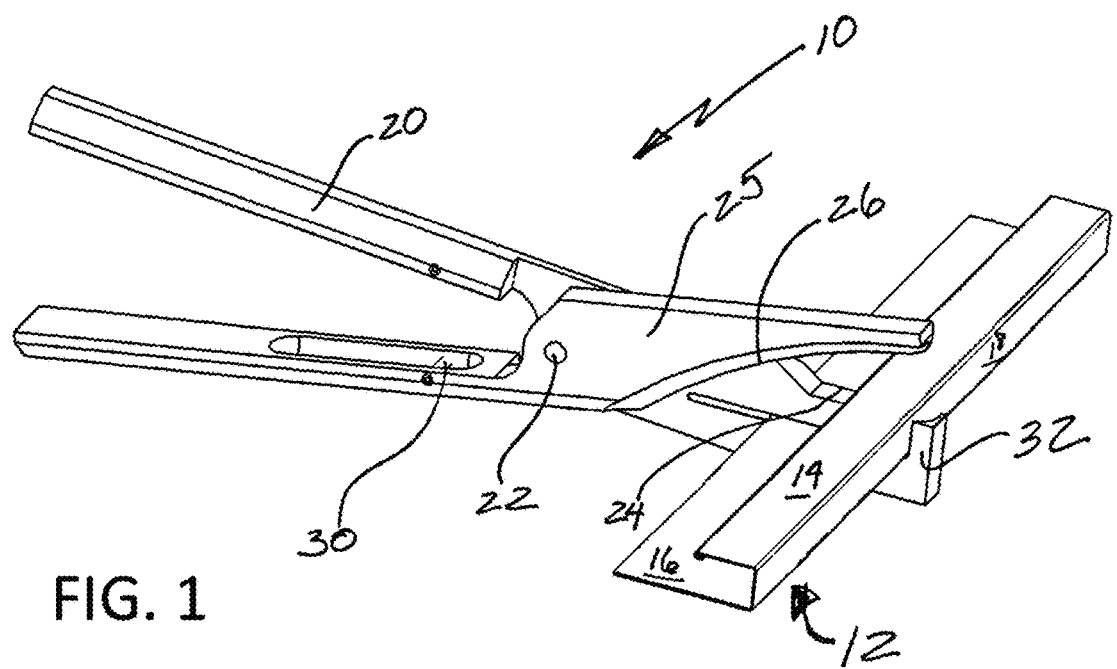
FIG. 1 is a perspective view of my multi-level cutter made in accordance with the present invention in operation of the method of use.

10. Multi-level cutter
12. J-channel siding
14. Back surface of J-channel siding
16. Front surface of J-channel siding
18. Bottom surface of J-channel siding
20. Multi-level cutter handle
22. Pivot point
24. Stationary blade cutting edge
25. Shear blade
26. Shear blade cutting edge
28. Lower cutting edge
30. Optional locking mechanism
32. Stationary blade support
34. Upper cutting edge
36. Second cutting surface
38. Stationary blade
40. J-channel shears
42. Shears pivot
43. Stationary blade
44. First cutting edge
46. Second cutting edge
48. Shear blade cutting edge
60. Shear handles

DETAILED DESCRIPTION OF THE INVENTION

In accordance with the present invention, a new, novel and non-obvious multi-level cutter is provided. This new multi-level cutter includes a single shearing blade and at least two stationary blades with cutting surfaces thereon for cutting 3-dimensional objects and having each cut being in solid alignment after cutting. In practicing the present invention, a J-channel siding piece is inserted through the cutting edges of the stationary blades so that when the shearing blade is brought into contact with the J-channel siding piece, a nearly simultaneous cut is made across each of the three surfaces of the J-channel.

This is advantageous because all angles being cut on the J-channel are exactly the same over the cross-section of the 3-dimensional angular cut. Because the stationary blades are positioned such that each of the stationary blades are located on top of each other, the cut is necessarily made at the same angle across the cross-section of the J-channel. As the shearing blade cuts through the J-channel, it cleanly cuts against each of the stacked up cutting edges of the stationary blade.

There are many 3-dimensional cuts that need to have the same angle cut across the entire cross-section such as J-channel siding, J-channel closet hanger receiver, house gutters, and the like, which are all good candidates for being cut by the present multi-level cutter. This is so because it is desired to have all surfaces of the J-channel items cut at the same angle all at once so that all the cuts are complementary.

Typical J-channel siding has a flat piece for attaching to the side of the house, terminating in a flat under-piece which curls under and upward to act as a drip edge. This multi-surface configuration is typically cut individually on each surface in conventional methods, resulting in uneven cutting. This uneven cutting does not yield a professional-looking cut, and the industry is in great need of a multi-level cutter that will provide professional-looking cuts every time. The same issue arises when cutting folded or multi-surface pieces such as J-channel gutters, etc.

Although the remainder of this disclosure will focus on J-channel siding, it is envisioned by the present inventor that any 3-dimensional piece, whether it be siding, gutters, clothing hanger receivers, or any other 3-dimensional part be included within the scope of this invention. In order to accommodate these other pieces, the shape of the multi-level cutter, commonly referred to as shears, will need to be formed specifically for the job at hand. Therefore, although the general concept of making multiple cuts with a single strike of the shears is novel, so will be the customization of the shape of the multiple cutting edges. The shears of the present invention include more than one specially shaped cutting edge on a single stationary blade, i.e. the multi-level cutter.

In the present invention, these multi-level J-channel cutter shears, comprise a shear blade permanently attached to a handle, a stationary blade having an L-shaped channel running therethrough creating at least an upper and a lower cutting edge, wherein said stationary blade includes multi-level cutting surfaces defining the upper and lower cutting edges, and wherein said stationary blade is also attached to a handle. As in traditional shears, a pivot point permanently attaches the shear blade to the stationary blade in a pivotal manner, permitting said handles to operate the shears. In this case, the stationary blade performs as a cutting anvil, where the shear blade cuts downwardly and against the stationary blade.

With this present configuration, a workpiece having complex angle construction can be inserted into the L-shaped channel so that said workpiece can be cut on all the complex angles in a single strike.

In particular, the multi-level J-channel cutter shears of the present invention may be constructed of hardened steel or any other suitable material. Considering their purpose, and the difficulty of the workpiece to be cut, steel is likely the best material for construction. In this aspect, the multi-level J-channel cutter shears include a shear blade having a single blade for shearing across both the upper and lower cutting edges of the stationary blade, one after the other to perform a single strike through the workpiece. While this aspect is described with reference particularly to J-channel, it is envisioned by the inventor that these shears may not only be used for complex angle workpieces, but it may also be used for straight cuts, alleviating the need for carrying multiple cutting instruments in their tool bag. It is also envisioned that additional cutting edges in configurations for cutting particular items. The shears can be used to cut workpieces not only including J-channel, but with minor modifications, may be used to cut items selected from the group consisting of aluminum window trim, formed gutters, door trim, clothes closet inverted hanger J-channel, and the like.

As in standard shears, the multi-level J-channel cutter shears of the present invention may include loop handles or straight tool handles.

In various aspects of the present invention, the multi-level J-channel cutter shears may position the elbow of the L-shaped channel in the stationary blade proximal to the pivot point, or the elbow of the L-shaped channel in the stationary blade may be positioned proximal to the blade tip of the shears. Leverage may be advantageously shifted from one position to the other, depending upon the application.

Referring now to the drawings in detail, FIG. 1 is a perspective view of a multi-level cutter generally indicated by numeral 10, which includes the proper placement of a piece of J-channel siding generally denoted by number 12. As one can see, J-channel siding has three surfaces, a back surface 14, a front surface 16, and a bottom surface 18, each being integral with the other, and being formed from a single piece. The J-channel is inserted through the multi-level cutter so that all three of the J-channel surfaces are cut nearly simultaneously by shear blade cutting edge 26 against the cutting edges of stationary blade 24. Handle 20 is to be used by an operator for bringing together the shear blade cutting edge 26 against the stationary blade cutting edge 24. Bottom surface 18 of J-channel 12 is held in position by stationary blade support 32. Handle 20 reciprocates against pivot point 22 in order to perform the method of shearing through J-channel 12. An optional locking mechanism 30 may be implemented for safety by locking the multi-level cutter in the closed position.

Looking next to FIG. 2, again we see multi-level cutter 10 with J-channel 12 inserted through its blades, although shown in a different perspective. Each of the elements are indicated similarly to FIG. 1, and the same numerals are used throughout. Clearly, J-channel 12 is situated in a nearly perpendicular fashion within the multi-level cutter blades. In this FIG., stationary blade support 32 is shown as incorporating an indented concave area so that J-channel 12 can be rotated in order to effect angular cuts. Again, shear blade cutting edge 26 mates against complementary stationary blade cutting edge 24 and immediately thereafter shears against the lower cutting surface of stationary blade (not shown in this FIG.).

Figure 2:
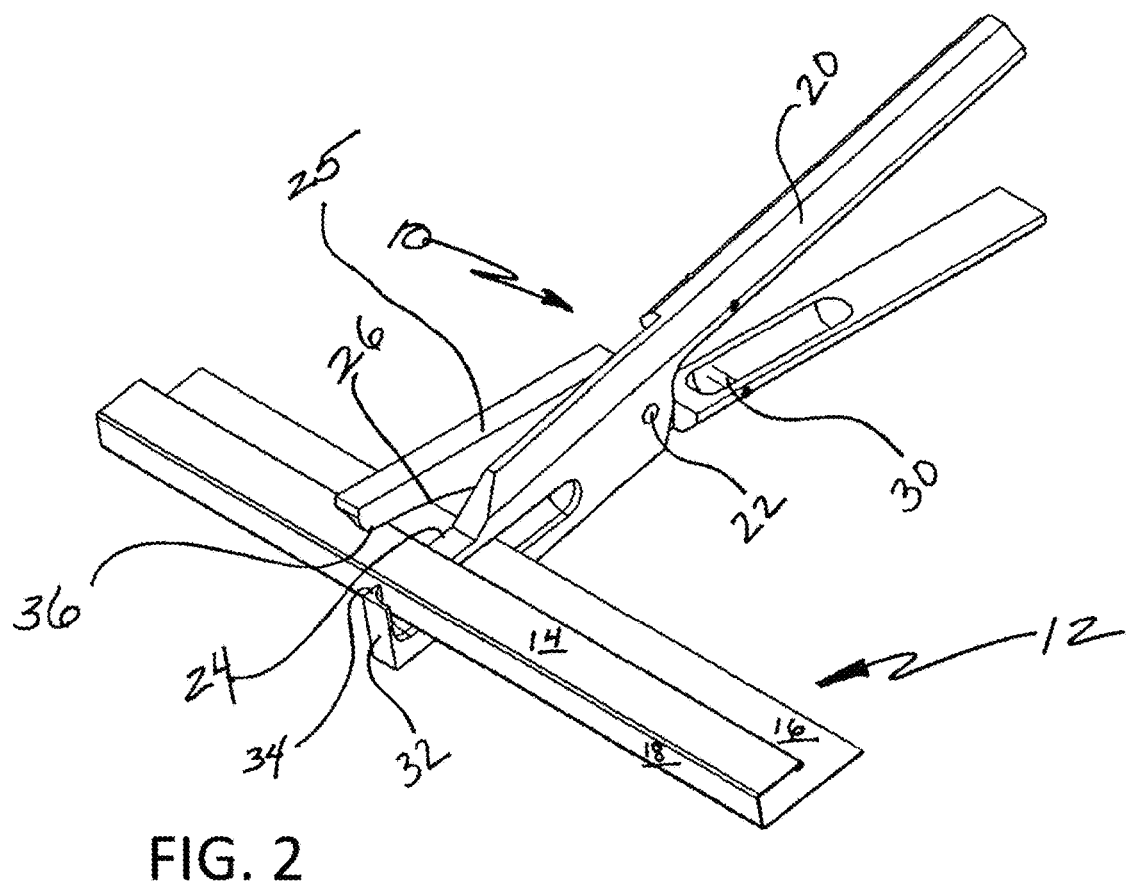
FIG. 2 illustrates a perspective view of my multi-level cutter making a perpendicular cut through the entire J-channel.
Figure 3:
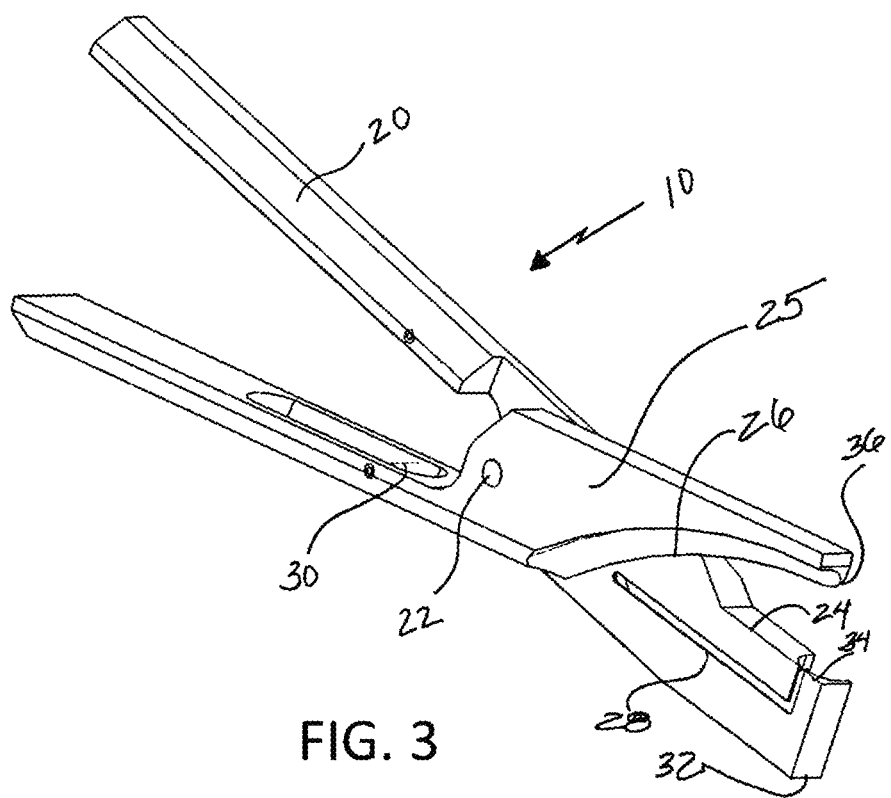
FIG. 3 shows a side perspective view of my multi-level cutter illustrating the multi-level cutting edges, made in accordance with the present invention.

After seeing the multi-level cutter 10 in FIGS. 1 and 2 with J-channel 12 inserted therethrough, we now look at FIG. 3 showing only the multi-level cutter 10. Shearing blade cutting edge 26 shears against upper cutting edge 24 and lower cutting edge 28. Further, as more clearly shown in this FIG., a second cutting surface 36 at the distal end of shear blade 25 which mates against the cutting edge 34 of stationary blade support 32. By cutting J-channel between the cutting edge 34 of stationary blade support 32 and the second cutting edge 36 of shear blade 25, bottom surface 18 (shown in FIGS. 1 & 2) will be cut at the same angle as back and front surfaces 14 and 16, respectively, of J-channel 12.

Figure 4:
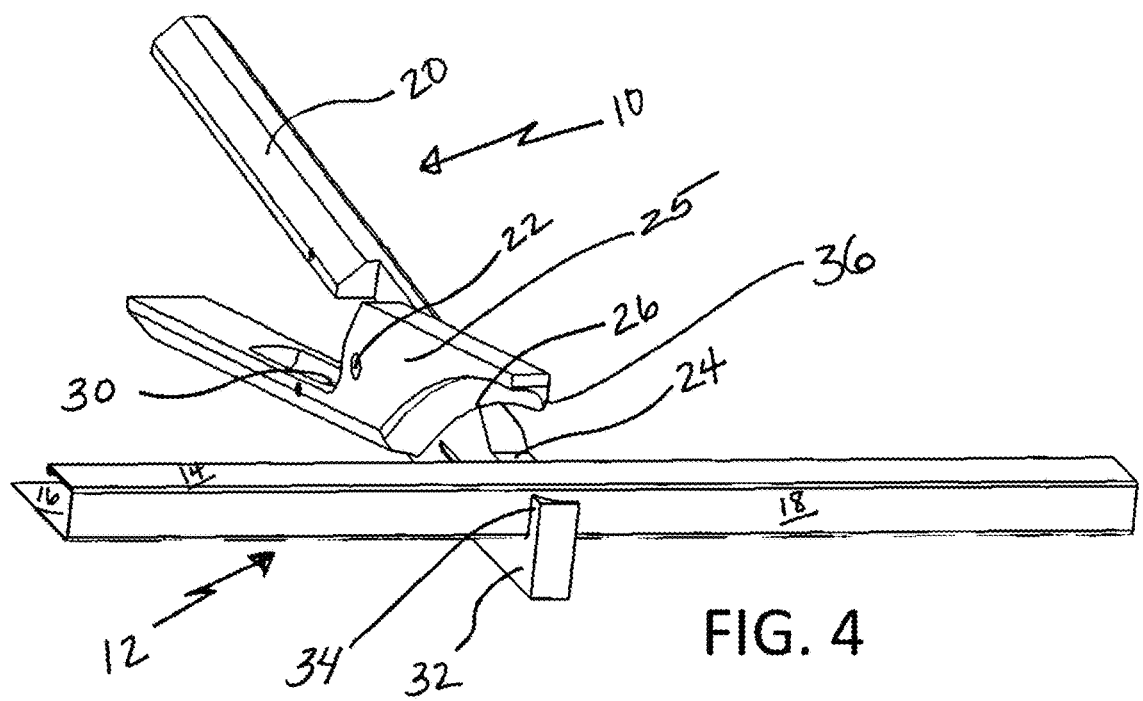
FIG. 4 details a perspective view of my multi-level cutter showing where the J-channel fits.

Looking next to FIG. 4, multi-level cutter 10 is shown as receiving J-channel 12 with proper placement of back and front surfaces 14 and 16 being integral with bottom surface 18. As may be more clearly seen in this FIG., stationary blade support 32 having cutting edge 34 mates with the second cutting edge 36 of shear blade 25 to cut all surfaces with one strike.

Figure 5:
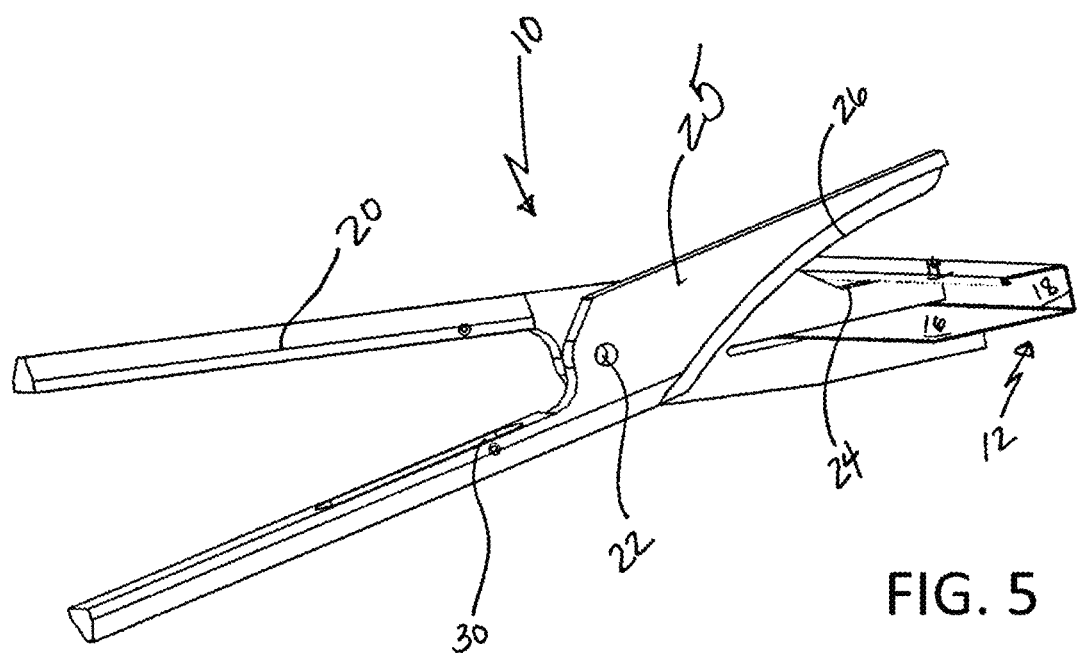
FIG. 5 illustrates a rear perspective view of my multi-level cutter making an angular cut.

Showing an angle cut in FIG. 5, J-channel 12 illustrates the relative placement of back and front surfaces 14 and 16, respectively where the cut will be simultaneously made by cutting edge 26 of shear blade 25. J-channel 12 is shown being cut at an angle such that bottom surface 18 of J-channel 12 is also cut at the same angle as the back and front surfaces, 14 and 16.

Figure 6:
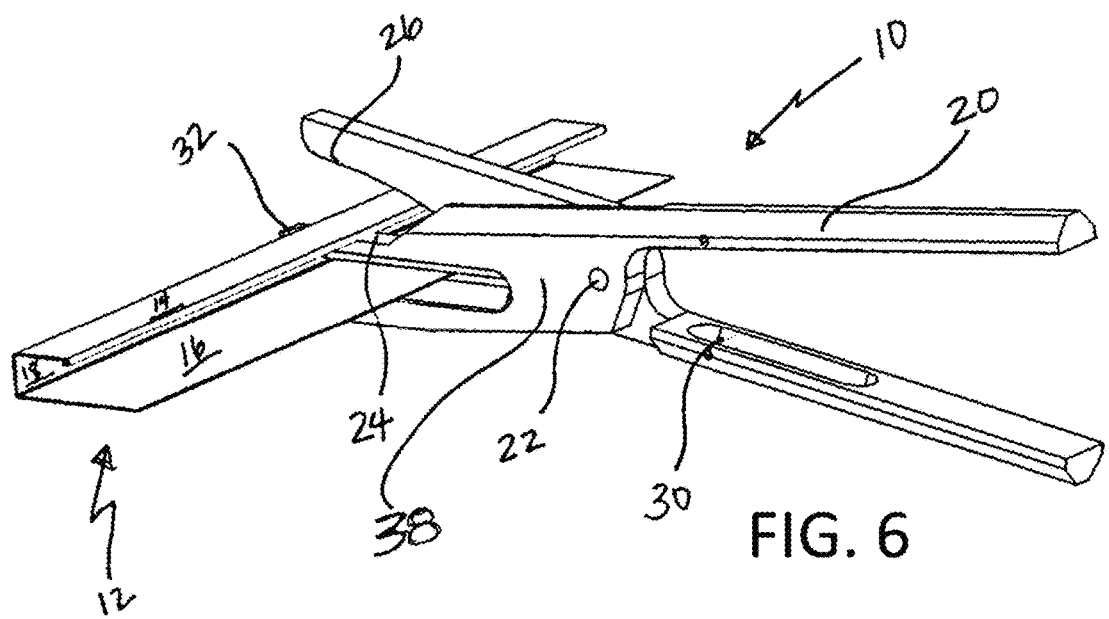
FIG. 6 is a rear perspective view of my multi-level cutter with a J-channel properly inserted.

FIG. 6 shows a different perspective view of multi-level cutter 10 with J-channel 12 as it is inserted for proper placement in the shear blade 25. As can be seen, J-channel 12 surrounds the extending portion of stationary blade 38, and runs through the slit between the upper and lower cutting edges.

Figure 7:
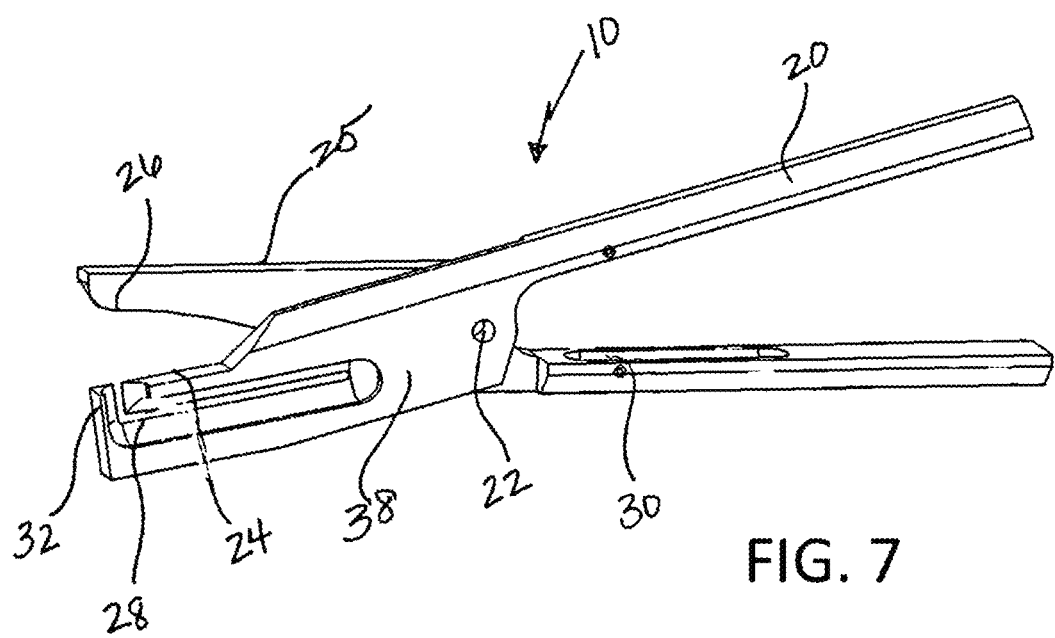
FIG. 7 shows a side elevational view of my multi-level cutter clearly showing the various cutting edges and their relative placement.

FIG. 7 clearly shows the recessed area in the stationary blade 38 for receiving the J-channel therethrough. Stationary blade cutting edge 24 is located to cut back surface 14 of J-channel 12, while lower cutting edge 28 of stationary blade will receive and position the front surface 16 of J-channel 12 to be cut as well once the shear blade cutting edge 26 of shear blade 25 is lowered over the J-channel, meeting with and cutting J-channel against the upper cutting edge 24 of stationary blade 38. As can also be clearly seen, cutting edge 26 of shear blade 25 will cut not only against upper cutting edge 24 of stationary blade 38, but also will cut against lower cutting edge 28 of stationary blade 38.

Figure 8:
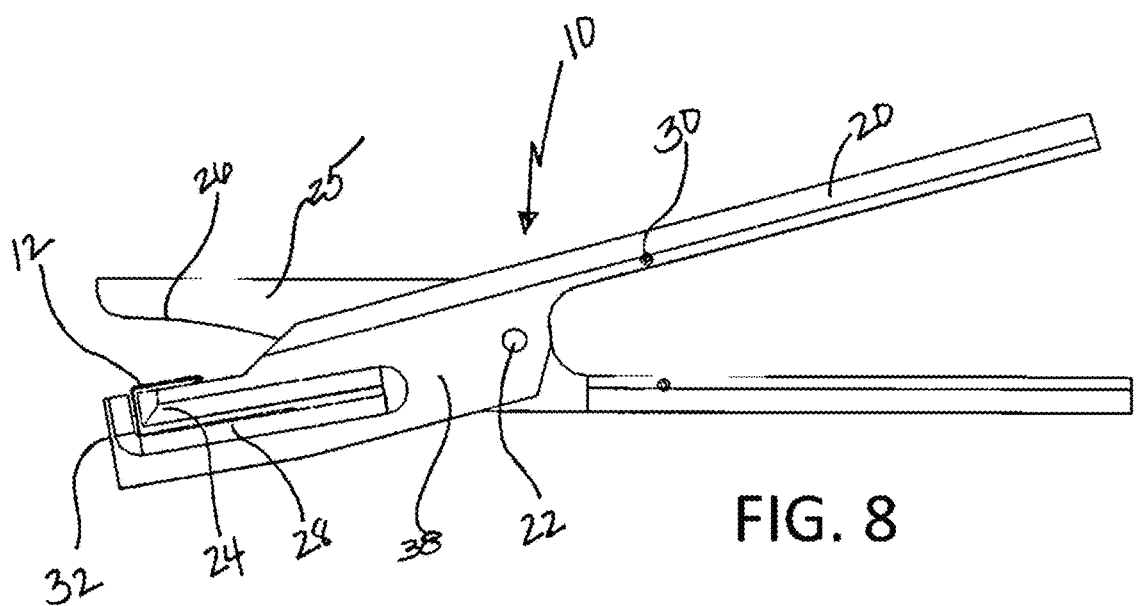
FIG. 8 illustrates a side elevational view of my multi-level cutter with a J-channel shown directly from a side elevational view.

FIG. 8 shows yet another aspect of the present invention wherein the shear blade 25 extends out over stationary blade support 32 and would cut anything in its path. Note that this is a side elevational view showing the relative placement of J-channel 12 in a perfect side-view, as J-channel 12 is positioned within the stationary blade 38. In this illustration, one can see that the cutting edge 26 of shear blade 25 cuts all the way through to the most distal portion of stationary blade support 32.

Figure 9:
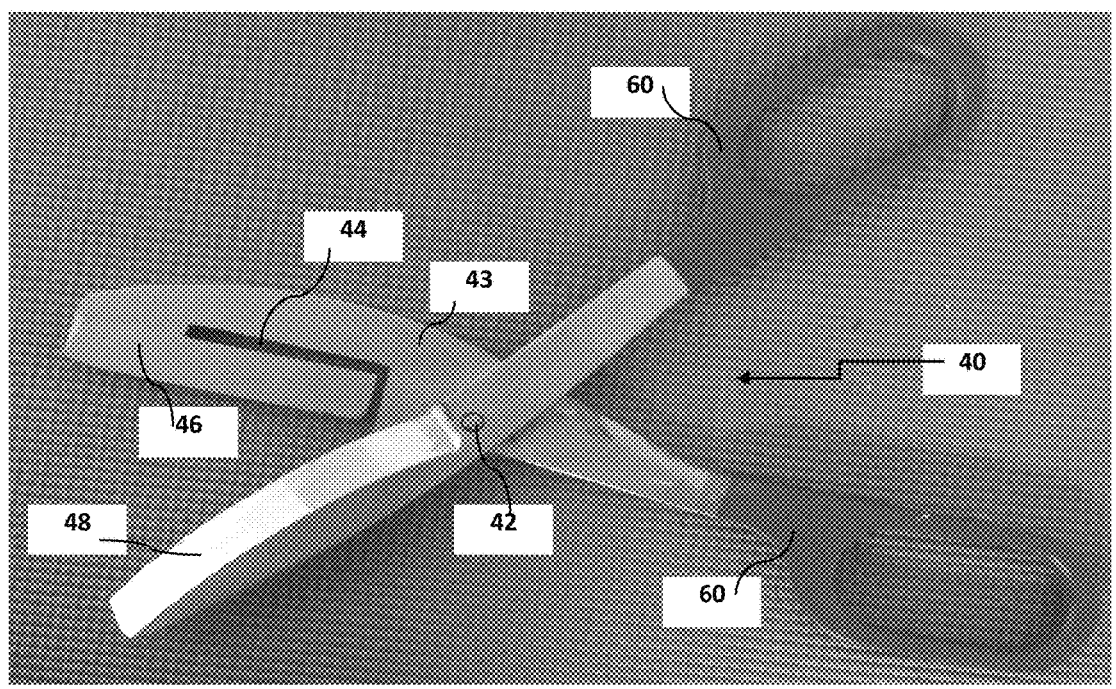
FIG. 9 illustrates yet another aspect of the present invention where the L-shaped channel for engaging a J-channel is reversed and placed proximal to the pivot.
Figure 10:
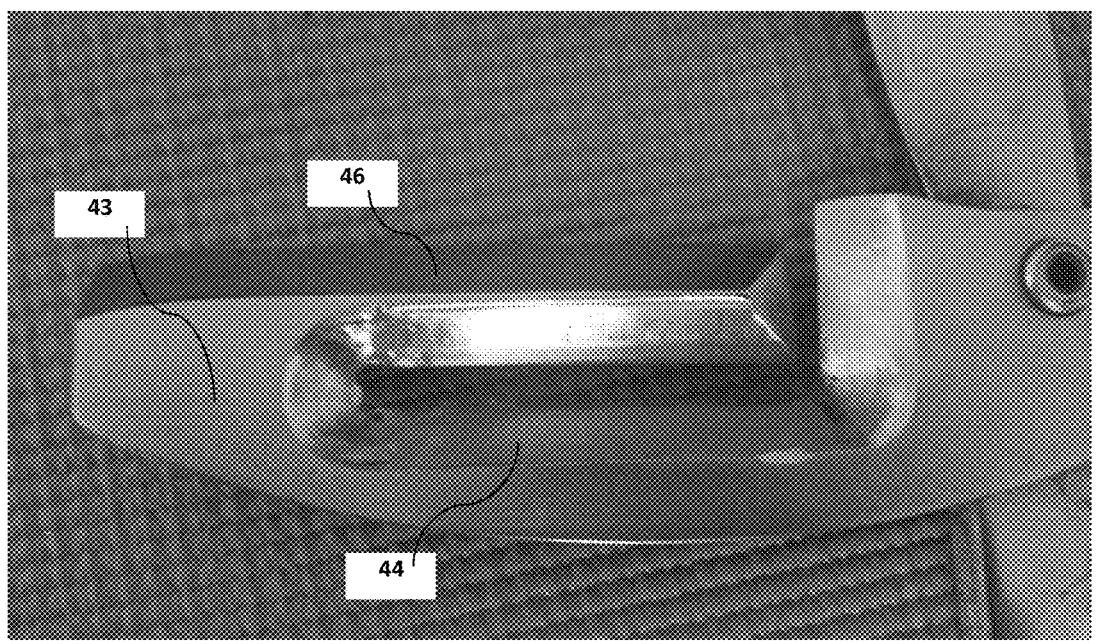
FIG. 10 shows a close up view of the dual cutting edges for engaging and cutting J-channel with a single strike.

Looking now to a second aspect of the present invention, FIGS. 9 and 10 show a different configuration for the L-shaped cutting channel for receiving a J-channel, with the L-shape more proximal to pivot 42. J-channel shears 40 comprise a stationary blade 43 with first and second cutting edges, 44 and 46 respectively. A shear blade cutting edge 48 is pivotally mounted onto stationary blade 43. After the J-channel is inserted into and through the L-shaped cutting channel, shear blade cutting edge is brought together with stationary blade 43 to perform a cutting operation, similar to the operation illustrated in FIG. 1, but with the complex angle of the J-channel proximal to pivot 42.

FIG. 10 is a close up view of the two cutting edges of the stationary blade 43, wherein first and second cutting edges, 44 and 46, respectively, are shown. This novel arrangement of two cutting edges cut from a single stationary blade, such as blade 43 herein, provides a cutting operation that can nearly simultaneously make numerous cuts on a single workpiece. This ability to make multiple cuts with a single strike of a shear cutting blade, such as element 48 of FIG. 9, provides a clean cut with either a straight cut, or one with precision angles. Conventional devices simply cannot provide cuts that are as accurate or clean as cuts made with the present device. Furthermore, no other J-channel cutter is a multi-level cutter that provides such clean and accurate cuts with a single strike of the shears. All other devices known to the inventor require multiple cuts, subjecting the operator to dangerously sharp edges, ready to slice into their hand.

In summary, numerous benefits have been described which result from employing any or all of the concepts and the features of the various specific aspects of the present invention, or those that are within the scope of the invention.

The foregoing description of a preferred aspect of the invention has been presented for purposes of illustration and description. It is not intended to be exhaustive or to limit the invention to the precise form disclosed. Obvious modifications or variations are possible in light of the above teachings with regards to the specific aspects. The aspect was chosen and described in order to best illustrate the principles of the invention and its practical applications to thereby enable one of ordinary skill in the art to best utilize the invention in various aspects and with various modifications as are suited to the particular use contemplated. It is intended that the scope of the invention be defined by the claims which are appended hereto.

What is claimed is:

1. Multi-level J-channel cutter shears, comprising:
   a shear blade permanently attached to a first handle;
   a stationary blade having an L-shaped channel running therethrough creating at least an upper cutting edge and a lower cutting edge, wherein said stationary blade includes multi-level cutting surfaces defining the upper and lower cutting edges, and wherein said stationary blade is also attached to a second handle;
   a pivot point permanently attaching the shear blade to the stationary blade in a pivotal manner, permitting said handles to operate the shears,
   whereby a workpiece having complex angle construction can be inserted into the L-shaped channel so that said workpiece can be cut on all its complex angles in a single strike.

2. The multi-level J-channel cutter shears of claim 1, wherein said cutter shears are constructed of hardened steel.

3. The multi-level J-channel cutter shears of claim 1, wherein said shear blade includes a single blade for shearing across both the upper and lower cutting edges of the stationary blade, one after the other to perform a single strike through the workpiece.

4. The multi-level J-channel cutter shears of claim 1, wherein the handles are loop handles.

5. The multi-level J-channel cutter shears of claim 1, wherein the L-shaped channel in the stationary blade positions an elbow of the L-shaped channel proximal to the pivot point.

6. The multi-level J-channel cutter shears of claim 1, wherein the stationary blade terminates in a blade tip, and said L-shaped channel in the stationary blade positions an elbow of the L-shaped channel proximal to the blade tip of the stationary blade.

* * * * *